(12) United States Patent
Pan et al.

(10) Patent No.: US 8,255,609 B2
(45) Date of Patent: Aug. 28, 2012

(54) SWITCH APPARATUS FOR SWITCHING DISPLAY, KEYBOARD, AND MOUSE

(75) Inventors: Jian-Chun Pan, Shenzhen (CN); De-Jun Zeng, Shenzhen (CN); Chung-Chi Huang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 62 days.

(21) Appl. No.: 12/962,591

(22) Filed: Dec. 7, 2010

(65) Prior Publication Data

US 2012/0131254 A1    May 24, 2012

(30) Foreign Application Priority Data

Nov. 23, 2010    (CN) .......................... 2010 1 0555641

(51) Int. Cl.
*G06F 13/00* (2006.01)

(52) U.S. Cl. .......................... 710/316; 709/238; 348/705

(58) Field of Classification Search .................. 348/705; 709/238–239; 725/141, 148; 710/316
See application file for complete search history.

(56) References Cited

U.S. PATENT DOCUMENTS

2011/0134331 A1*    6/2011    King et al. .................... 348/705

* cited by examiner

*Primary Examiner* — Clifford Knoll
(74) *Attorney, Agent, or Firm* — Altis Law Group, Inc.

(57) ABSTRACT

A switch apparatus includes first to third video graphics array (VGA) interfaces, first to sixth universal serial bus (USB) interfaces, a single-pole double-throw (SPDT) switch, and first to eighteenth electronic switches. The first VGA interface is connected to the second and third VGA interfaces through the electronic switches. The first USB interface is connected the second and third USB interfaces through the electronic switches. The fourth USB interface is connected to the fifth and sixth USB interfaces through the electronic switches. The SPDT switch is used to control the first VGA interface to be selectively connected to the second or third VGA interface, and control the first USB interface to be selectively connected to the second or third USB interface, and control the fourth USB interface to be selectively connected to the fifth or sixth USB interface.

2 Claims, 4 Drawing Sheets

SWITCH APPARATUS FOR SWITCHING DISPLAY, KEYBOARD, AND MOUSE

CROSS-REFERENCE TO RELATED APPLICATION

Relevant subject matter is disclosed in a pending U.S. patent application which is assigned to the same assignee as named herein, and has an application Ser. No. 12/957,418 and an application date of Dec. 1, 2010.

BACKGROUND

1. Technical Field

The present disclosure relates to a switch apparatus for switching displays, keyboards, and mice.

2. Description of Related Art

When a motherboard is tested, a computer with a display, a mouse, and a keyboard is required to test the motherboard. Additionally, a second computer with a display, a mouse, and a keyboard is also required to help operators to check circuit diagrams or other test files. Therefore, testing a motherboard needs two displays, two mice, and two keyboards at the same time, which is costly and occupies a lot of space.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
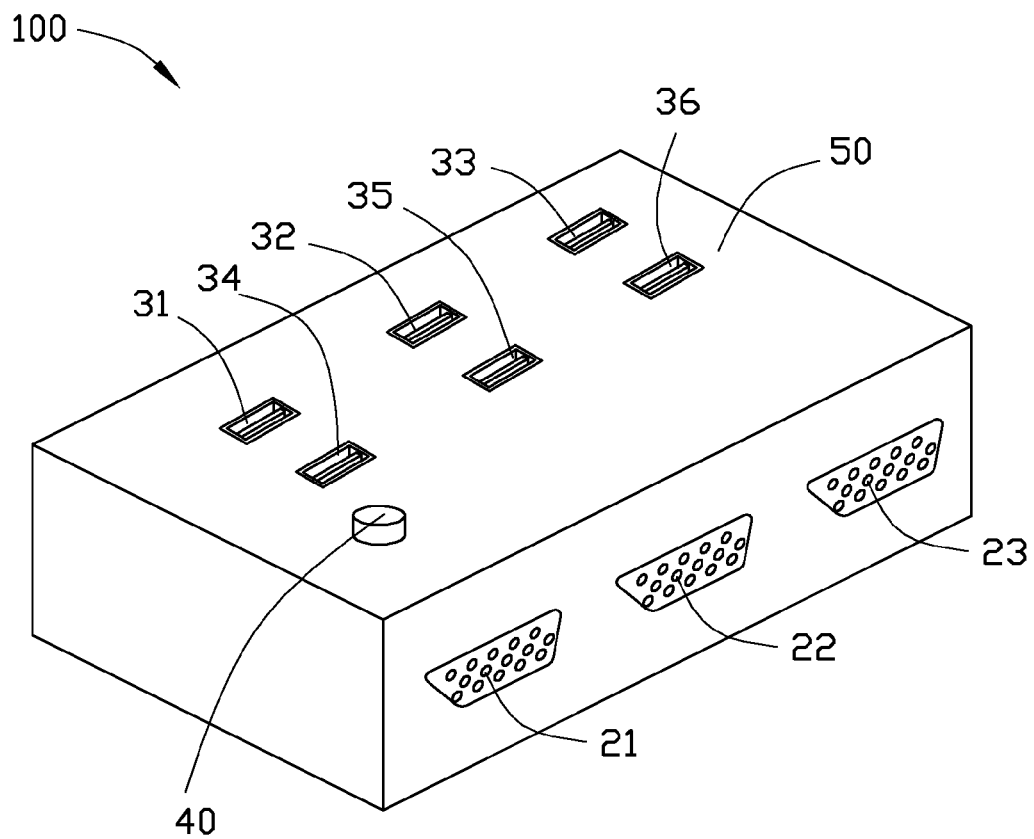
FIG. 1 is an isometric, schematic view of an embodiment of a switch apparatus for switching a display, a keyboard, and a mouse.
Figure 2:
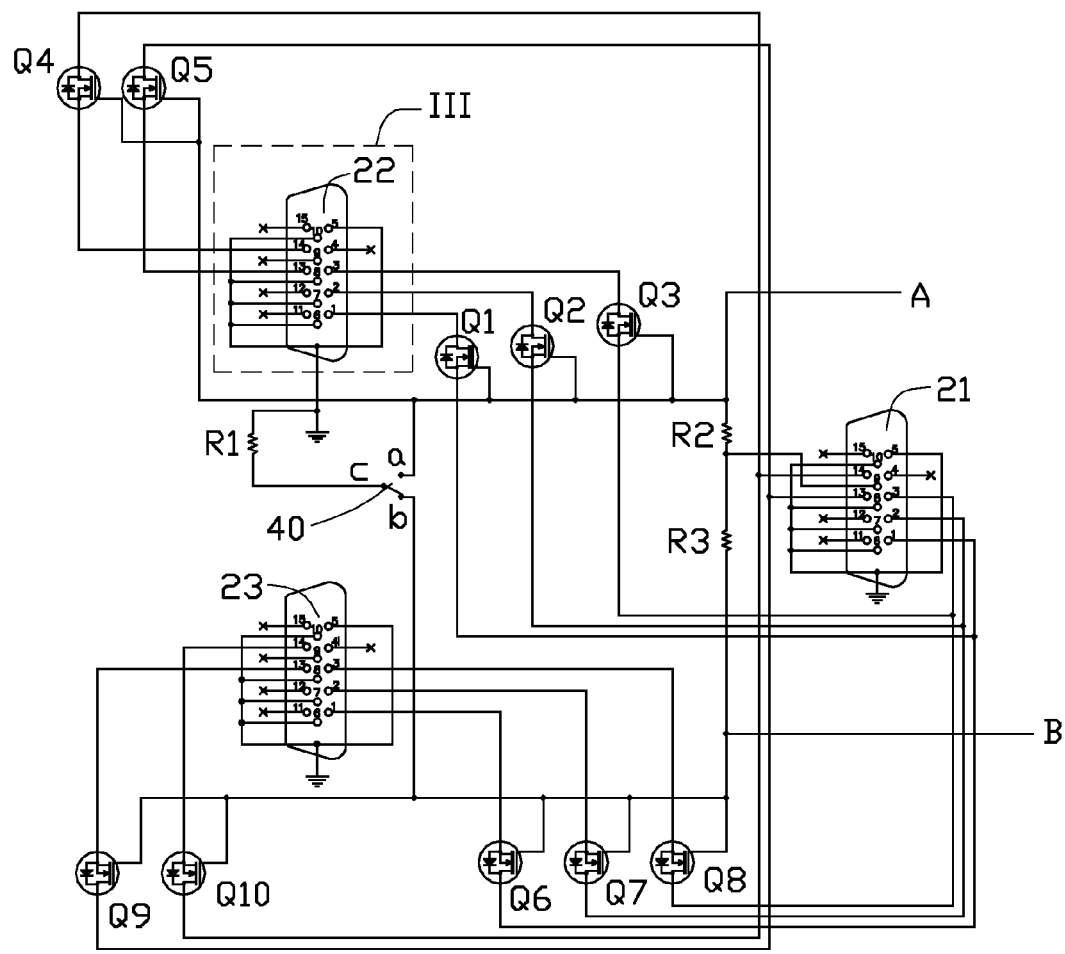
FIGS. 2 and 3 shows a circuit diagram of the switch apparatus of FIG. 1.
Figure 3:
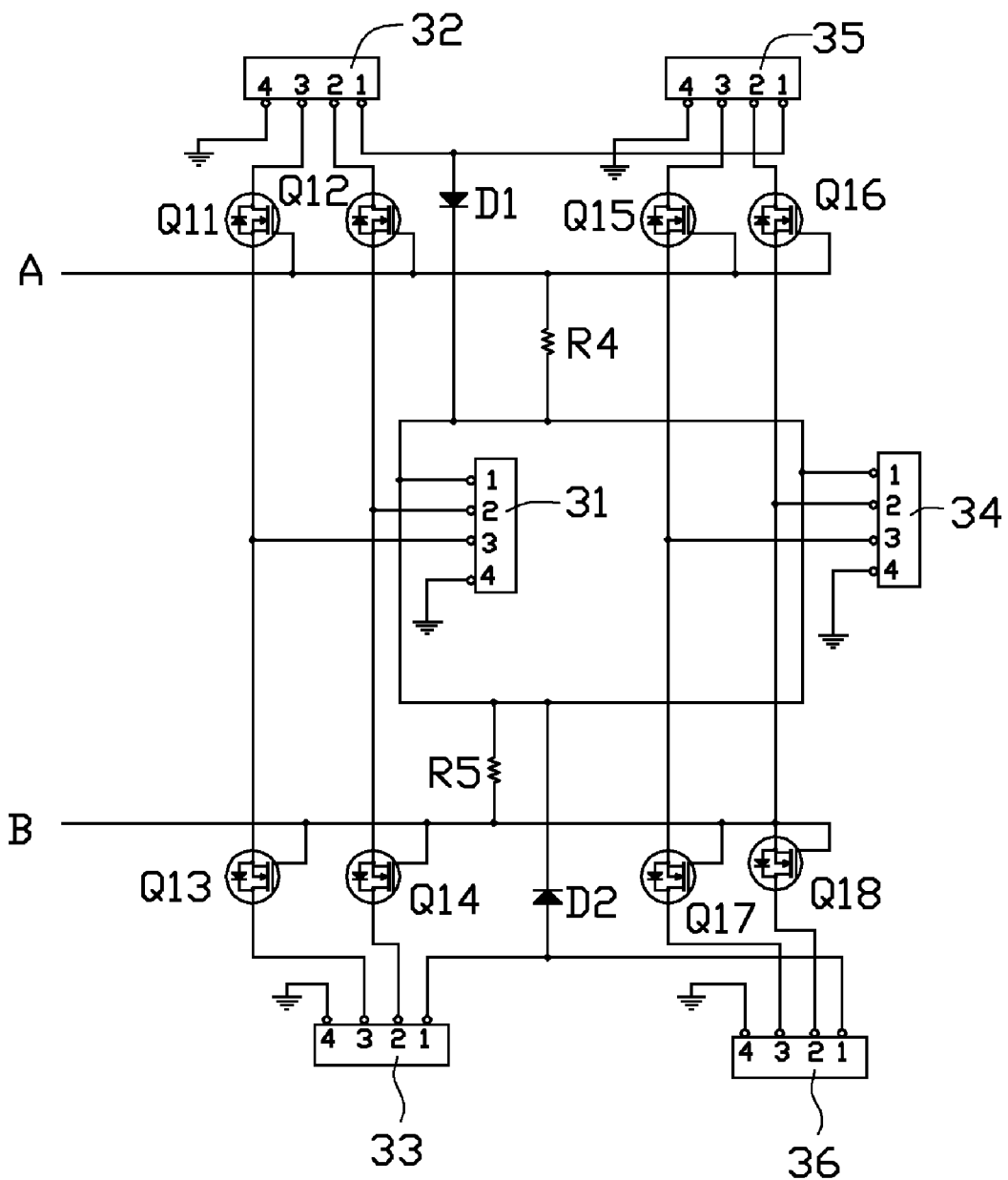
Figure 4:
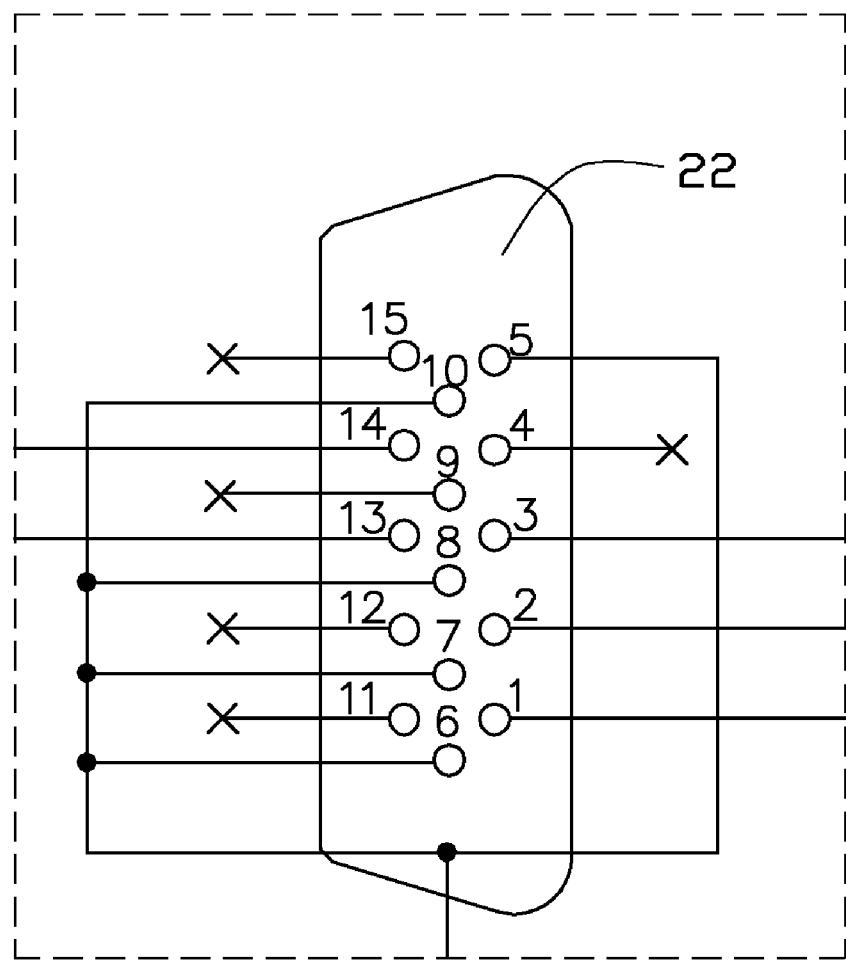
FIG. 4 is an enlarged view of a circled portion III of FIG. 2.

Referring to FIGS. 1 to 4, an embodiment of a switch apparatus 100 for switching a display, a keyboard, and a mouse includes first to third video graphics array (VGA) interfaces 21-23, first to sixth universal serial bus (USB) interfaces 31-36, a single-pole double-throw (SPDT) switch 40, eighteen electronic switches Q1-Q18, five resistors R1-R5, and two diodes D1 and D2. The switch 40 includes a pole c that is electrically connected to one of two throws a or b. When the switch 40 is pressed and the pole c is connected to throws a or b, the pole c is switched to be electrically connected to the other one of the throws a and b.

In one embodiment, the first to third VGA interfaces 21-23, the first to sixth USB interfaces 31-36, and the switch 40 are mounted on a rectangular case 50, and the other elements described above are arranged in the case 50. All of the elements arranged in the case 50 can be arranged on a circuit board. In one embodiment, the electronic switches Q1-Q18 are n-channel metal-oxide-semiconductor (NMOS) field effect transistors (FETs). Each of the electronic switches Q1-Q18 includes first to third terminals respectively corresponding to a gate, a drain, and a source of the NMOS FET. In other embodiments, the electronic switches Q1-Q18 can be changed to other types of electronic switches, such as p-type transistors.

Each of the first to third VGA interfaces 21-23 includes fifteen pins 1-15. In detail, for each of the interfaces 21-23, the pins 1-3 are respectively red-green-blue (RGB) three channel video signal pins, the pin 13 is a horizontal synchronization (HSYNC) pin, the pin 14 is a vertical synchronization (VSYNC) pin, the pin 9 is a power pin, the pins 5-8, and 10 are ground pins, the pins 4, 11, 12, and 15 are respectively ID0 pin, ID1 pin, SDA pin, and SCL pin. The pins 5-8, and 10 are grounded. The pins 4, 11, 12, and 15 are idle. Each of the first to fourth USB interfaces 31-36 includes a power pin 1, a first signal pin 2, a second signal pin 3, and a ground pin 4. The ground pins are grounded.

The RGB pins 1-3 of the first VGA interface 21 are respectively connected to the third terminals of the electronic switches Q1-Q3, and respectively connected to the second terminals of the electronic switches Q6-Q8. The HSYNC pin 13 and the VSYNC pin 14 of the first VGA interface 21 are respectively connected to the second terminals of the electronic switches Q5 and Q4, and respectively connected to the second terminals of the electronic switches Q9 and Q10. The RGB pins 1-3 of the second VGA interface 22 are respectively connected to the second terminals of the electronic switches Q1-Q3. The HSYNC pin 13 and the VSYNC pin 14 of the second VGA interface 22 are respectively connected to the third terminals of the electronic switches Q5 and Q4. The RGB pins 1-3 of the third VGA interface 23 are respectively connected to the third terminals of the electronic switches Q6-Q8. The HSYNC pin 13 and the VSYNC pin 14 of the third second VGA interface 22 are respectively connected to the third terminals of the electronic switches Q9 and Q10.

The pole c of the switch 40 is grounded through the resistor R1. The throw a of the switch 40 is connected to the first terminals of the electronic switches Q1-Q5, Q11, Q12, Q15, and Q16, and connected to the power pin 9 of the first VGA interface 21 through the resistor R2. The throw b of the switch 40 is connected to the first terminals of the electronic switches Q6-Q10, Q13, Q14, Q17, and Q18, and connected to the power pin 9 of the first VGA interface 21 through the resistor R3.

The power pin 1 of the first USB interface 31 is connected to the power pin 1 of the fourth USB interface 34, and connected to the cathodes of the diodes D1 and D2. The anode of the diode D1 is connected to the power pins 1 of the second and fifth USB interfaces 32 and 35. The anode of the diode D2 is connected to the power pins 1 of the third and sixth USB interfaces 33 and 36. The power pin 1 of the first USB interface 31 is connected to the throw a of the switch 40 through the resistor R4, and connected to the throw b of the switch through the resistor R5.

The first signal pin 2 of the first USB interface 31 is connected to the third terminals of the electronic switches Q12 and Q14. The second signal pin 3 of the first USB interface 31 is connected to the third terminals of the electronic switches Q11 and Q13. The first and second signal pins 2 and 3 of the second USB interface 32 are respectively connected to the second terminals of the electronic switches Q12 and Q11. The first and second signal pins 2 and 3 of the third USB interface 33 are respectively connected to the second terminals of the electronic switches Q14 and Q13.

The first signal pin 2 of the fourth USB interface 34 is connected to the third terminals of the electronic switches Q16 and Q18. The second signal pin 3 of the fourth USB interface 34 is connected to the third terminals of the electronic switches Q15 and Q17. The first and second signal pins 2 and 3 of the sixth USB interface 36 are respectively connected to the second terminals of the electronic switches Q18 and Q17.

In use, the first VGA interface 21 is connected to a VGA interface of a display (not shown). The second VGA interface 22 and the third VGA interface 23 are respectively connected to a VGA interface of a first motherboard (not shown) and a VGA interface of a second motherboard (not shown). A USB keyboard (not shown) is connected to the first USB interface 31. The second and third USB interfaces 32 and 33 are respectively connected to two USB interfaces of the first and second motherboards. A mouse (not shown) is connected to the fourth USB interface 34. The fifth and sixth USB interfaces 35 and 36 are respectively connected to two USB interfaces of the first and second motherboards. The first and second motherboards are turned on, and if the pole c is electrically connected to the throw a of the switch 40, the throw a is in a low voltage state, and the throw b is in a high voltage state. The electronic switches Q6-Q10, Q13, Q14, Q17, and Q18 are turned on, and the electronic switches Q1-Q5, Q11, Q12, Q15, and Q16 are turned off. Therefore, the first motherboard can communicate with the display, the keyboard, and the mouse. If the switch 40 is pressed, the pole c is electrically connected to the throw b of the switch 40, the throw a is in a high voltage state, and the throw b is in a low voltage state. The electronic switches Q6-Q10, Q13, Q14, Q17, and Q18 are turned off, and the electronic switches Q1-Q5, Q11, Q12, Q15, and Q16 are turned on. Therefore, the second motherboard can communicate with the display, the keyboard, and the mouse. The switch apparatus 100 can control two motherboards to selectively communicate with one display, one keyboard, and one mouse, which can save on costs and space.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A switch apparatus for switching a display, a mouse, and a keyboard, the switch apparatus comprising:
    first to third video graphics array (VGA) interfaces each comprising a power pin, a horizontal synchronization (HSYNC) pin, a vertical synchronization (VSYNC) pin, and three channel video signal pins;
    first to sixth universal serial bus (USB) interfaces each comprising a power pin, a first signal pin, a second signal pin, and a ground pin grounded;
    a single-pole double-throw (SPDT) switch comprising a pole, a first throw, and a second throw;
    first to fifth resistors;
    first and second diodes each comprising an anode and a cathode; and
    first to eighteenth electronic switches each comprising first to third terminals, wherein each electronic switch is turned on in response to the first terminal being at a high voltage state;
    wherein the three channel video signal pins of the first VGA interface are respectively connected to the third terminals of the first to third electronic switches, and respectively connected to the second terminals of the sixth to eighth electronic switches, the HSYNC pin and the VSYNC pin of the first VGA interface are respectively connected to the second terminals of the fifth and fourth electronic switches, and respectively connected to the second terminals of the ninth and tenth electronic switches, the three channel video signal pins of the second VGA interface are respectively connected to the second terminals of the first to third electronic switches, the HSYNC pin and the VSYNC pin of the second VGA interface are respectively connected to the third terminals of the fifth and fourth electronic switches, the three channel video signal pins of the third VGA interface are connected to the third terminals of the sixth to eighth electronic switches, the HSYNC pin and the VSYNC pin of the third VGA interface are respectively connected to the third terminals of the ninth and tenth electronic switches, the pole of the SPDT switch is grounded through the first resistor, the first throw of the SPDT switch is connected to the first terminals of the first to fifth, eleventh, twelfth, fifteenth, and sixteenth electronic switches, and connected to the power pin of the first VGA interface through the second resistor, the second throw of the SPDT switch is connected to first terminals of the sixth to tenth, thirteenth, fourteenth, seventeenth, and eighteenth electronic switches, and connected to the power pin of the first VGA interface through the third resistor, the power pins of the first to fourth USB interfaces are connected to the cathodes of the first and second diodes, the anode of the first diode is connected to the power pins of the second and fifth USB interfaces, the anode of the first diode is connected to the power pin of the third and sixth USB interfaces, the power pin of the first USB interface is connected to the first throw of the SPDT switch through the fourth resistor, and connected to the second throw of the SPDT switch through the fifth resistor, the first signal pin of the first USB interface is connected to the third terminals of the twelfth and fourteenth electronic switches, the second signal pin of the first USB interface is connected to the third terminals of the eleventh and thirteenth electronic switches, the first and second signal pins of the second USB interface are respectively connected to the second terminals of the twelfth and eleventh electronic switches, the first and second signal pins of the third USB interface are respectively connected to the second terminals of the fourth and thirteenth electronic switches, the first signal pin of the fourth USB interface is connected to the third terminals of the sixteenth and eighteenth electronic switches, the second signal pin of the fourth USB interface is connected to the third terminals of the fifteen and seventeenth electronic switches, the first and second signal pins of the fifth USB interface are respectively connected to the second terminals of the sixteenth and fifteenth electronic switches, the first and second signal pins of the sixth USB interface are respectively connected to the second terminals of the eighteenth and seventeenth electronic switches.

2. The switch apparatus of claim 1, wherein the first to eighteenth electronic switches are n-channel mental-oxide-semiconductor (NMOS) field effect transistors (FETs), the first to third terminals are respectively corresponding to gates, drains, and sources of the NMOS FETs.

* * * * *